United States Patent
McGee et al.

(10) Patent No.: US 7,198,588 B2
(45) Date of Patent: Apr. 3, 2007

(54) SYSTEM AND METHOD FOR CONTROLLING ENGINE IDLE IN A VEHICLE

(75) Inventors: Ryan Abraham McGee, Ann Arbor, MI (US); Christopher John Teslak, Plymouth, MI (US); Carol Louise Okubo, Belleville, MI (US)

(73) Assignee: Ford Global Technologies, LLC., Dearborn, MI (US)

( * ) Notice: Subject to any disclaimer, the term of this patent is extended or adjusted under 35 U.S.C. 154(b) by 283 days.

(21) Appl. No.: 10/250,193

(22) Filed: Jun. 11, 2003

(65) Prior Publication Data
US 2004/0254045 A1    Dec. 16, 2004

(51) Int. Cl.
*B60K 1/02*  (2006.01)

(52) U.S. Cl. .............................. 477/3; 477/114; 475/5; 180/65.2

(58) Field of Classification Search ................. 477/3, 477/4, 114; 475/5, 2; 180/65.2, 65.6; 123/339, 123/339.14, 339.16, 339.19
See application file for complete search history.

(56) References Cited

U.S. PATENT DOCUMENTS

| | | | |
|---|---|---|---|
| 4,883,034 A * | 11/1989 | Yashiki et al. ......... 123/339.17 |
| 5,730,675 A * | 3/1998 | Yamaguchi ..................... 475/2 |
| 6,109,237 A | 8/2000 | Pels et al. |
| 6,146,302 A * | 11/2000 | Kashiwase ...................... 475/5 |
| 6,155,954 A | 12/2000 | Itoyama et al. |
| 6,258,006 B1 * | 7/2001 | Hanyu et al. ................... 477/5 |
| 6,362,536 B1 | 3/2002 | Izumiura |
| 6,634,984 B1 * | 10/2003 | Doering et al. ............. 477/107 |
| 6,664,651 B1 * | 12/2003 | Kotre et al. ................... 290/29 |
| 6,688,411 B2 * | 2/2004 | Boggs et al. .............. 180/65.2 |

\* cited by examiner

*Primary Examiner*—David D. Le
(74) *Attorney, Agent, or Firm*—David B. Kelley; Brooks & Kushman

(57) ABSTRACT

A method for controlling engine idle in a vehicle having a motor connected to the engine through a power transfer unit is provide. Upon receiving a neutral command, the engine torque is commanded to approximately zero. The motor torque is adjusted to maintain an approximately constant engine speed as the engine torque is reduced. The torque from the engine transferred to the vehicle wheels is at or near zero. When the torque at the vehicle wheels is non-zero, a second motor is used to cancel the torque output from the engine so the torque at vehicle wheels is zero. When the engine torque has reached approximately zero, or when a predetermined amount of time has past, both motors are shutdown, and all of the remaining engine torque is transferred to the first motor through the power transfer unit.

20 Claims, 2 Drawing Sheets

US 7,198,588 B2

SYSTEM AND METHOD FOR CONTROLLING ENGINE IDLE IN A VEHICLE

BACKGROUND OF INVENTION

1. Field of the Invention

The present invention relates to a system and method for controlling engine idle in a vehicle.

2. Background Art

In a conventional wheeled vehicle having an internal combustion engine, the engine delivers torque to the wheels to propel the vehicle. When the engine is in a idling state, however, torque transfer to the wheels is interrupted. For example, when the vehicle is placed in neutral, a clutch may be used to physically disconnect the engine from the wheels, thereby resulting in zero torque transfer from the engine to the wheels.

Some vehicle architectures do not include a clutch that allows the engine to be disconnected from the vehicle wheels. In such an architecture, an alternative solution must be provided to allow the engine to idle without transferring torque to the vehicle wheels. One solution may include having a device connected to the engine that could selectively reduce its resistance to the engine torque. One example of this would be having a motor connected to the engine that could be selectively shutdown. Once shutdown, the motor would receive all of the engine torque, since the motor would provide far less torque resistance than the vehicle wheels.

This solution may be problematic, however, if immediately upon entering a neutral state, all of the torque being produced by the engine is transferred to the motor. In such a situation, the engine speed may increase to an impermissibly high level. The increase in engine speed may result in undesirably loud engine noise detected by the vehicle driver, or may be so great as to cause engine damage. Thus, there exists a need for a system and method for controlling engine idle in a vehicle when the engine maintains a direct connection to the vehicle wheels.

SUMMARY OF INVENTION

Therefore, a method for controlling engine idle in a vehicle having a motor connected to the engine through a power transfer unit is provided. The power transfer unit is connected to the vehicle wheels. The method includes commanding engine torque to a predetermined level, thereby reducing the engine torque. The motor torque is adjusted to maintain an approximately constant engine speed as the engine torque is reduced. This effects torque transfer from the power transfer unit to the vehicle wheels that is at or near zero.

The invention further provides a method for controlling engine idle in a vehicle having a motor connected to the engine through a power transfer unit. The power transfer unit is connected to the vehicle wheels. The method includes commanding engine torque to a predetermined level, thereby reducing the engine torque. The motor torque is adjusted to maintain an approximately constant engine speed as the engine torque is reduced. This effects torque transfer from the power transfer unit to the vehicle wheels that is at or near zero. The vehicle also includes a second motor connected to the vehicle wheels. The method further includes controlling torque of the second motor to produce zero torque at the vehicle wheels when the torque transfer from the power transfer unit to the vehicle wheels is non-zero.

The invention also provides a method for controlling engine idle in a vehicle having a motor connected to the engine through a power transfer unit. The power transfer unit is connected to the vehicle wheels. The method includes commanding the engine into a first idle state. The first idle state includes a non-zero motor torque output and a torque transfer from the power transfer unit to the vehicle wheels that is at or near zero. The engine is commanded into a second idle state, which includes a zero motor torque output and a zero torque transfer from the power transfer unit to the vehicle wheels.

The invention further provides a system for controlling engine idle in a vehicle having wheels. The system includes a power transfer unit connected to the engine and the vehicle wheels. The power transfer unit is configured to transfer mechanical power to and from the engine and to and from the vehicle wheels. A motor is connected to the engine through the power transfer unit. The system also includes at least one controller for controlling the engine and the motor. The at least one controller is configured to command engine torque to a predetermined level, thereby reducing the engine torque. The at least one controller is further configured to adjust the motor torque to maintain an approximately constant engine speed as the engine torque is reduced. This effects a torque transfer from the power transfer unit to the vehicle wheels that is at or near zero.

The above objects, features, and advantages of the present invention are readily apparent from the following detailed description of the best modes for carry out the invention when taken in connection with the accompanying drawings.

DETAILED DESCRIPTION

Figure 1:
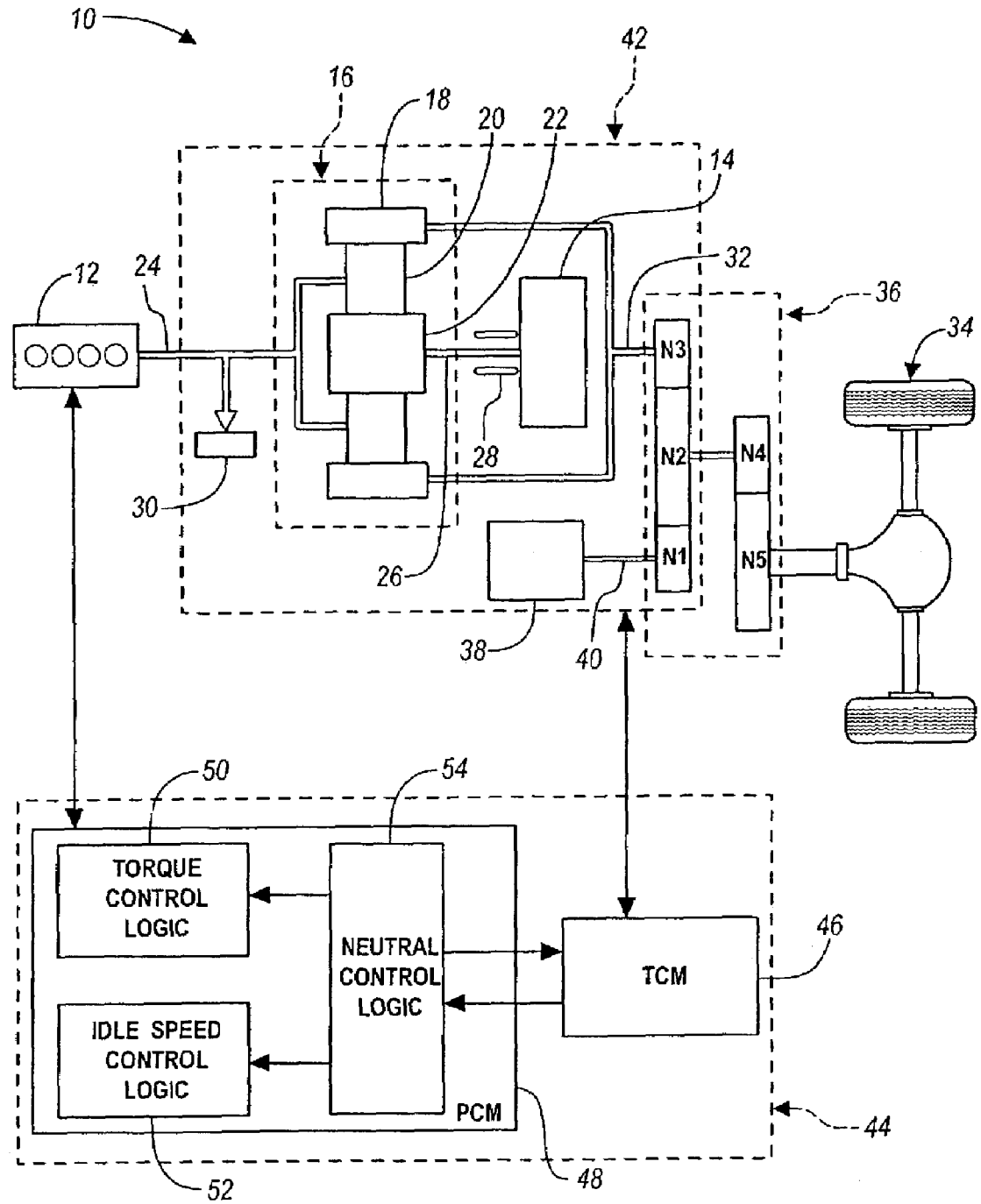
FIG. 1 is schematic representation of a portion of a vehicle including a system in accordance with the present invention.

FIG. 1 shows a schematic representation of a system 10 in accordance with the present invention. A vehicle, not shown in its entirety, includes an engine 12 and motor 14. The engine 12 and motor 14 are connected through a power transfer unit, which in this embodiment is a planetary gear set 16. Of course, other types of power transfer units, including other gear sets and transmissions, may be used to connect the engine 12 to the motor 14. The planetary gear set 16 includes a ring gear 18, a carrier 20, and a sun gear 22. An engine shaft 24 is connected to the carrier 20, while a motor shaft 26 is connected to the sun gear 22. A motor brake 28 is provided for stopping rotation of the motor shaft 26, thereby locking the sun gear 22 in place. Because this configuration allows torque to be transferred from the motor 14 to the engine 12, a one-way clutch 30 is provided so that the engine shaft 24 rotates in only one direction.

The ring gear 18 is connected to a shaft 32, which is connected to vehicle wheels 34 through a second gear set 36. Thus, the planetary gear set 16 is connected to the vehicle wheels. The vehicle includes a second motor 38, which is also connected to the vehicle wheels 34 through a motor shaft 40 and the second gear set 36. As seen in FIG. 1, the motors 14,38, the planetary gear set 16, and a portion of the second gear set 36 may generally be referred to as a transaxle 42.

In the vehicle configuration shown in FIG. 1, many of the electrical systems have been removed for clarity. For example, the motors 14, 38 may be connected to a battery which provides electrical power to run them. Alternatively, one or both of the motors 14, 38 could act as a generator, which is used to charge the battery when the vehicle is in a regenerative mode. The vehicle architecture shown in FIG. 1 is but one of many different architectures that can be used with the system 10.

For example, as mentioned above, the planetary gear set 16 could be replaced with different types of power transfer units. In addition, a disconnect clutch could be placed on the engine shaft 24 to allow a mechanical disconnection of the engine output from the vehicle wheels 34. Moreover, different types of electrical output devices, such as a fuel cell or ultra-capacitor may be used in place of, or in conjunction with, a battery. Although the system 10 is applicable to many different types of vehicle architectures, it may be particularly well suited to vehicle architectures that do not have a disconnect clutch between the engine and the vehicle wheels. This is because the system 10 provides a method for controlling engine idle to eliminate output torque at the vehicle wheels without relying on a mechanical disconnection between the engine and the wheels.

A controller 44 is provided for controlling the engine 12 and the motors 14, 38. Although shown as a single unit, the controller 44 may be made up of more than one controller. For example, such controllers may be separate hardware devices, or separate software controllers that reside within a single hardware controller, such as the controller 44. In the embodiment shown in FIG. 1, the controller 44 is made up of two separate controllers, a transaxle control module (TCM) 46 and a powertrain control module (PCM) 48. As seen in FIG. 1, the TCM 46 is in communication with the PCM 48. In addition, each controls a different portion of the vehicle. For example, the PCM 48 controls the engine 12, while the TCM 46 controls the transaxle 42, including the motors 14, 38, the one-way clutch 30, and the motor brake 28.

The PCM 48 is shown to include three separate control logics: a torque control logic 50, an idle speed control logic 52, and a neutral control logic 54. Although shown as separate control logics, the three control logics 50, 52, 54 may be integrated into a single instruction set within the PCM 48. Alternatively, each of the control logics 50, 52, 54 could reside in a separate hardware controller, or could exist as a separate instruction set or instruction sets within another controller in the vehicle. Connecting such controllers with a controller area network (CAN) allows the control logic used in the system 10 to be placed in virtually any convenient location within a vehicle.

Figure 2:
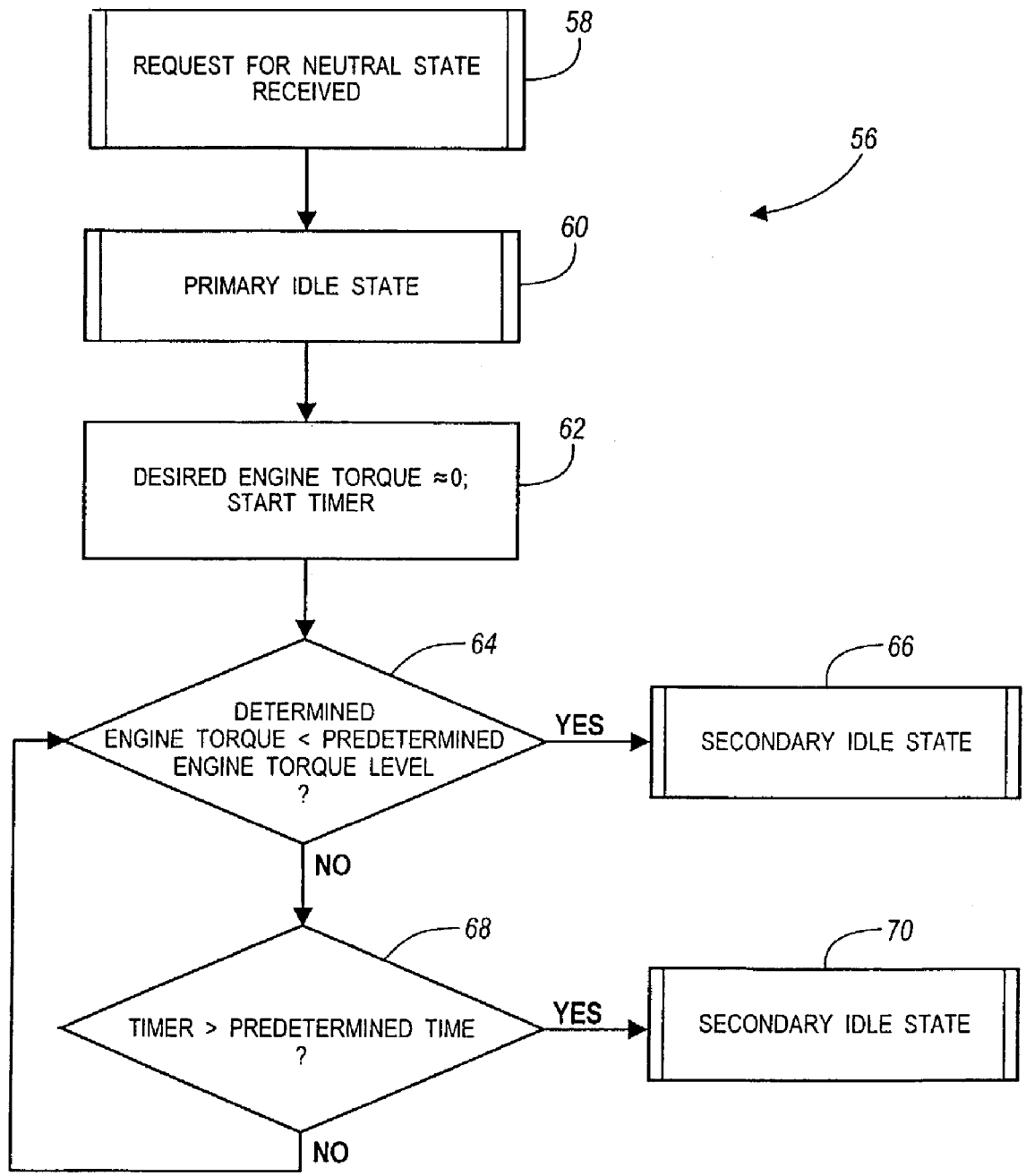
FIG. 2 is a flowchart illustrating a method in accordance with the present invention.

The neutral control logic 54, shown in FIG. 1, employs a method for controlling engine idle when the engine maintains a mechanical connection to the vehicle wheels. This method is illustrated in FIG. 2, which shows a flowchart 56 enumerating the steps involved in the method. Initially, at step 58, there is a request received for the vehicle to enter a neutral state. This request will often come as a result of the vehicle driver manually shifting into neutral. The request for neutral state is received by the controller 44, which initially commands the engine into a first, or primary idle state, shown in step 60.

To achieve the primary idle state, the PCM 48 uses the torque control logic 50 to command the engine torque to a predetermined level, which, as shown in step 62, is approximately zero. Of course, the engine torque may be commanded to a different predetermined level, but since the vehicle has been commanded into a neutral state, it may be desirable to significantly reduce the engine torque level. Control of the engine torque can be achieved by any effective method, including those well known in the field of engine control-e.g., control of the mass air flow.

As the engine torque is reduced as a result of the engine torque command, the driver would notice a significant reduction in engine speed if no other controls were applied. Therefore, in order to maintain an approximately constant engine speed as the engine torque is reduced, the output torque of the motor 14 is also reduced. In this way, the engine 12 maintains its speed as its torque is reduced; in addition, the torque transferred from the planetary gear set 16 to the vehicle wheels 34 is at or near zero. Since the driver has commanded the vehicle into a neutral state, it is desirable that the vehicle wheels 34 should receive no torque; otherwise, the vehicle will have a tendency to move even though it has been commanded into neutral.

In the embodiment shown in FIG. 1, the engine 12 and the motor 14 are connected through the planetary gear set 16. When the ring gear is either not moving, or is moving at a fixed rate, there is a known relationship between the engine speed and the motor speed. Similarly, there is a known relationship between the engine torque and the motor torque. Other types of power transfer units—i.e., other than the planetary gear set 16—may also have power transfer unit relationships between the engine speed/torque and the motor speed/torque. Thus, the TCM 46, which controls the motor 14, can adjust the motor output torque to whatever level is necessary to maintain the speed of the engine 12.

By reducing the torque of the motor 14, and maintaining the speed of the engine 12, the torque transferred from the planetary gear set 16 to the vehicle wheels 34 may be zero; however, the engine torque may not be entirely canceled by the motor 14, and some torque may therefore reach the vehicle wheels 34. Because the driver has commanded the vehicle into a neutral state, any torque reaching the vehicle wheels 34 would result in unexpected and undesirable movement of the vehicle. To account for this possibility, the second motor 38 is used to cancel any torque that is output at the shaft 32. The second motor 38 is also controlled by the TCM 46, which receives feedback signals from the various components of the transaxle 42. Thus, if any torque is output to the shaft 32 from the planetary gear set 16, the TCM 46 need only command the motor 38 to output an equal and opposite torque such that the net torque to the vehicle wheels 34 is zero.

Although the vehicle may be maintained in this neutral state, the engine may also be commanded into a second, or secondary idle state, wherein less control of the transaxle 42 is required. For example, if the motor 14 is completely shutdown, all of the torque output from the engine 12 will be used to spin the motor shaft 26, and none of it will be transferred to the ring gear 18 or to the vehicle wheels 34. This is because the motor 14 will provide almost no resistance to the engine torque after the motor 14 is shutdown. It may not be desirable, however, to shutdown the motor 14 when the torque of the engine 12 is still at a relatively high level. Thus, after the engine 12 has been commanded to the primary idle state, and the engine torque has been commanded to the predetermined level, it may be desirable to determine the engine torque prior to shutting-down the motor 14. The determined engine torque could then be compared to the predetermined engine torque level to see if the engine torque has been reduced far enough to allow the motor 14 to be shutdown.

There are, of course, many different ways by which the torque of the engine 12 may be determined. For example, a strain gauge could be placed on the shaft 24 to measure the amount of twist in the shaft 24. Relating this value to known material properties of the shaft 24 would allow for a direct measurement of the torque being output by the engine 12. Alternatively, the relationship between the torque of the engine 12 and the torque of the motor 14 may be usefully employed to determine the level of engine torque. For example, while the TCM 46 is controlling the motor 14 to maintain the speed of the engine 12, the TCM 46 also receives feedback signals from the motor 14 which indicate the level of torque being output by the motor 14. As described above, the power transfer unit, or planetary gear set 16, provides a known relationship between the motor torque and the engine torque, such that the motor torque can be used to determine the engine torque.

Returning to FIG. 2, at step 64, the determined engine torque is compared to the predetermined engine torque level to see if the determined engine torque has fallen below the predetermined engine torque level. If it has, the engine is commanded into the secondary idle state, as shown in step 66. Because it will take some time for the engine torque to fall below the predetermined level, it may be desirable to set a time limit such that the engine 12 is commanded into the secondary idle state even when the engine torque does not fall below the predetermined level. Thus, in step 62, at the time the engine 12 is commanded to the predetermined engine torque level, a timer is started.

If, at step 64, it is found that the determined engine torque has not fallen below the predetermined engine torque level, the timer value will be compared with a predetermined time, as shown in step 68. If the timer value is not above the predetermined time, the determined engine torque will again be compared to the predetermined engine torque level, see step 64, to see if the engine 12 should be commanded into the secondary idle state. When the engine torque does not fall below the predetermined engine torque level within the predetermined time, the engine 12 will nonetheless be commanded into the secondary idle state, as shown in step 70.

The secondary idle state is characterized by shutting-down the motor 14 and the motor 38. When the motor 14 is shutdown, it is allowed to "free wheel". All of the torque output from the engine 12 is then transferred to the motor 14. The motor 38 is also shutdown, since none of the engine torque will be transferred to the ring gear 18, and the motor 38 will not be required to cancel torque transferred from the planetary gear set 16 to the vehicle wheels 34. In the secondary idle state, the idle speed control logic 52 is employed to maintain the engine speed. This may include any efficacious speed control method, including those utilizing control of the engine air, fuel, and spark.

While the best mode for carrying out the invention has been described in detail, those familiar with the art to which this invention relates will recognize various alternative designs and embodiments for practicing the invention as defined by the following claims.

The invention claimed is:

1. A method for controlling engine idle in a vehicle having a motor connected to an engine through a power transfer unit, the power transfer unit being connected to vehicle wheels, the method comprising:

commanding engine torque to a predetermined level, thereby effecting a reduction in the engine torque; and adjusting motor torque to maintain an approximately constant engine speed as the engine torque is reduced, thereby effecting a torque transfer from the power transfer unit to the vehicle wheels that is at or near zero.

2. The method of claim 1, wherein the vehicle includes a second motor connected to the vehicle wheels, the method further comprising controlling torque of the second motor to produce a zero torque at the vehicle wheels when the torque transfer from the power transfer unit to the vehicle wheels is non-zero.

3. The method of claim 1, wherein the predetermined engine torque level is zero.

4. The method of claim 1, further comprising:

determining the engine torque after the engine torque is commanded to the predetermined level; and comparing the determined engine torque to the predetermined engine torque level.

5. The method of claim 4, wherein determining the engine torque comprises determining the motor torque and applying a known power transfer unit relationship to the motor torque, the power transfer unit relationship relating the motor torque to the engine torque.

6. The method of claim 4, further comprising shutting-down the motor when the determined engine torque falls below the predetermined engine torque level.

7. The method of claim 4, further comprising shutting-down the motor after a predetermined amount of time, when the determined engine torque does not fall below the predetermined engine torque level within the predetermined amount of time.

8. A method for controlling engine idle in a vehicle having a motor connected to an engine through a power transfer unit, the power transfer unit being connected to vehicle wheels, the method comprising:

commanding the engine into a first idle state, the first idle state including a non-zero motor torque output and a torque transfer from the power transfer unit to the vehicle wheels that is at or near zero; and commanding the engine into a second idle state, the second idle state including a zero motor torque output, and a zero torque transfer from the power transfer unit to the vehicle wheels.

9. The method of claim 8, wherein commanding the engine into the second idle state comprises shutting-down the motor, thereby facilitating transfer of the engine torque to the motor.

10. The method of claim 8, wherein commanding the engine into a first idle state comprises commanding engine torque to a predetermined level, thereby effecting a reduction in the engine torque, and adjusting motor torque to maintain an approximately constant engine speed as the engine torque is reduced.

11. The method of claim 10, further comprising:

determining the engine torque after the engine torque is commanded to the predetermined level; and comparing the determined engine torque to the predetermined engine torque level.

12. The method of claim 11, wherein determining the engine torque comprises determining the motor torque and applying a known power transfer unit relationship to the motor torque, the power transfer unit relationship relating the motor torque to the engine torque.

13. The method of claim 11, wherein the engine is commanded into the second idle state after the determined engine torque falls below the predetermined engine torque level.

14. The method of claim 11, wherein the engine is commanded into the second idle state after a predetermined amount of time, when the determined engine torque does not fall below the predetermined engine torque level within the predetermined amount of time.

15. The method of claim 8, wherein the vehicle includes a second motor connected to the vehicle wheels, the method further comprising controlling torque of the second motor to produce a zero torque at the vehicle wheels when the torque transfer from the power transfer unit to the vehicle wheels is non-zero.

16. The method of claim 15, wherein commanding the engine into the second idle state comprises shutting-down the second motor.

17. A system for controlling engine idle of an in a vehicle having wheels, the system comprising:
 a power transfer unit connected to the engine and the vehicle wheels, the power transfer unit being configured to transfer mechanical power to and from the engine and to and from the vehicle wheels;
 a motor connected to the engine through the power transfer unit; and
 at least one controller for controlling the engine and the motor, the at least one controller being configured to command engine torque to a predetermined level, thereby effecting a reduction in the engine torque, and further configured to adjust motor torque to maintain an approximately constant engine speed as the engine torque is reduced, thereby effecting a torque transfer from the power transfer unit to the vehicle wheels that is at or near zero.

18. The system of claim 17, wherein the at least one controller comprises a transaxle control module and a powertrain control module in communication with each other, the transaxle control module being configured to control the motor, and the powertrain control module being configured to control the engine.

19. The system of claim 17, further comprising a second motor connected to the vehicle wheels, and wherein the at least one controller is further configured to control torque of the second motor to produce a zero torque at the vehicle wheels when the torque transfer from the power transfer unit is non-zero.

20. The system of claim 17, wherein the at least one controller is further configured to shutdown the motor when the engine torque falls below the predetermined level.

* * * * *